United States Patent [19]
Richardson

[11] 4,200,707
[45] Apr. 29, 1980

[54] POLYAMIDE NUCLEATED WITH ZINC PHENYL PHOSPHINATE OR ZINC PHENYL PHOSPHONATE

[75] Inventor: Paul N. Richardson, Wilmington, Del.

[73] Assignee: E. I. Du Pont de Nemours and Company, Wilmington, Del.

[21] Appl. No.: 933,077

[22] Filed: Aug. 11, 1978

[51] Int. Cl.² .............................................. C08L 77/06
[52] U.S. Cl. .......................................... 525/2; 525/4;
528/313; 528/319; 528/336; 528/485; 528/487

[58] Field of Search ............... 526/2, 4; 528/336, 313, 528/319

[56] References Cited
FOREIGN PATENT DOCUMENTS
866252  3/1971  Canada .

Primary Examiner—Harold D. Anderson

[57] ABSTRACT

A blend of a condensation polyamide and zinc phenyl phosphinate and/or zinc phenyl phosphonate nucleating agent has been found to result in resins having good strength.

5 Claims, No Drawings

POLYAMIDE NUCLEATED WITH ZINC PHENYL PHOSPHINATE OR ZINC PHENYL PHOSPHONATE

FIELD OF THE INVENTION

This invention is directed to polyamide resins, and particularly to polyamide resins containing a nucleating agent.

BACKGROUND OF THE INVENTION

Nucleating agents are employed as a processing aid primarily to accelerate crystallization from a melt. Other advantages of using nucleating agents include inducing formation of small, uniform-sized spherulites, and reducing mold shrinkage.

Acceleration of crystallization results in faster molding cycles, which of course means greater productivity in molding operations. However, some properties of polyamide resins are altered by the presence of a nucleating agent. For example, when the nucleating agent is sodium phenyl phosphinate (a common polyamide nucleating agent), the Izod impact strength and elongation are adversely affected.

SUMMARY OF THE INVENTION

Nucleating agents have now been found which do not affect Izod impact strength and elongation to the same extent as sodium phenyl phosphinate.

In particular, this invention comprises a blend of (i) a resin of a condensation polyamide and (ii) zinc phenyl phosphinate and/or zinc phenyl phosphonate particles present in an amount sufficient to accelerate crystallization from a melt of the blend over a melt of the polyamide resin alone.

DESCRIPTION OF THE INVENTION

The polyamides employed in this invention are those polyamide resins formed by the condensation polymerization of polycarboxylic acids with polyamines. They are referred to herein as condensation polyamides or as nylon resins. The polyamides include polymers made by the condensation of linear diamines represented by the formula $H_2N-(CH_2)_x-NH_2$, where x is an integer between 6 and 12, with linear dicarboxylic acids represented by the formula $HO_2C-(CH_2)_y-CO_2H$, where y is zero or an integer between 1 and 8. Equally well, these polyamides may be made from amide-forming derivatives of said amines and acids such as esters, acid chlorides, amine salts, etc. Representative dicarboxylic acids used to make the polyamides include adipic acid, pimelic acid, suberic acid, sebacic acid, and dodecanedioic acid, while representative diamines include hexamethylene diamine and octamethylene diamine. Generally, the intrinsic viscosity of the polyamides will be at least about 1.0. Preferably the condensation polyamide employed herein is polyhexamethylene adipamide (nylon 6,6). Also included within the scope of this invention are copolymers, such as a copolymer of nylon 6,6 and polylactams, e.g., nylon 6 (polycaprolactam); and blends of polyamides, such as a mixture of nylon 6,6 and nylon 6.

Zinc phenyl phosphinate can be prepared by dissolving phenyl phosphinic acid and zinc acetate in separation portions of distilled water and mixing the solutions. The white precipitate of zinc phenyl phosphinate is collected. The zinc phenyl phosphonate can be prepared from zinc acetate and phenyl phosphonic acid.

The amount of zinc phenyl phosphinate and/or phosphonate nucleating agent employed in the blends of this invention is an amount sufficient to accelerate crystallization from a melt over a melt of the polyamide alone. Generally, this amount will be between 0.01 to 1.0 weight percent based on weight of polyamide. A preferred amount is between about 0.05 and 0.1 weight percent.

The blends of this invention can be prepared in a number of ways, as the nucleating agent or combination of agents may be added to the nylon resin at any convenient time. For example, the nucleating agent or agents may be distributed over the surface of nylon molding granules by dry blending a mixture of the two prior to feeding the granules to an extruder or to an injection molding apparatus or other forming device. Equally well, the agent or agents in suspension in a low-boiling liquid, such as a petroleum ether or an alcohol, may be sprayed over the surfaces of the nylon granules and the solvent evaporated. If desired, a small amount of a binding agent may be incorporated into the low-boiling solvent or added with the powdered nucleating agent or agents to prevent dusting and to bind the powder to the nylon granule surfaces. Another method of adding the nucleating agent or agents is to mix the powder with the molten nylon resin prior to preparation of the molding granules; in some cases, the nucleating agent or agents may be added during or prior to the polymerization of the polyamide.

Alternatively, a master batch of phosphinate and/or phosphonate and polyamide can be prepared by extruding the polyamide with the agent or agents. This master batch, or concentrate, can then be mixed with additional polyamide.

Although not conclusively studied, there is some indication that at about 300° C., zinc phenyl phosphinate may partially convert into zinc phenyl phosphonate.

If desired, the blends of this invention can also contain lubricating agents to aid in mold release. Such agents include the fatty acids or their derivatives. The blends may also contain dyes or pigments such as carbon black or titanium dioxide.

A typical preparation of zinc phenyl phosphinate is as follows: 14 g (0.0985 moles) of phenyl phosphinic acid was dissolved in 200 mls of distilled water, and 11 g (0.05 moles) of zinc acetate.$2H_2O$ was dissolved in 50 mls of distilled water. The two solutions were mixed and a white precipitate formed which was collected on a filter. The product was washed on the filter with distilled water, and was dried overnight in a vacuum oven at 80° C. The product weighed 13.5 g. This was a 79% yield based upon the phenyl phosphinic acid.

In the examples and controls which follow, the appropriate phosphinate or phosphonate was coated on nylon 6,6 granules by tumbling in a polyethylene bag, and the coated granules extruded at 270° C. in a 28 mm Werner and Pfleiderer twin screw extruder. Tests on resins were run dry as molded.

Tensile strength and elongation measurements were made by ASTM D638, on ⅛-inch thick specimens pulled at 2 inches per minute.

Izod impact strength was determined by ASTM D256 on ⅛-inch thick specimens.

Mold shrinkage was determined by measuring the length of five ⅛-inch thick tensile test bars and subtracting the average from the length of the mold cavity. The difference is divided by the length of the cavity to give mold shrinkage in dimensionless units of in/in. All samples were molded under the same conditions: Melt temperature 285° C., Mold temperature 90° C., Cycle 50 sec. and injection melt pressure of 10700 psi.

EXAMPLE 1

Resins of nylon 66 and zinc phenyl phosphinate were prepared as described above. Amount of phosphinate and properties of the resin are set forth in Table 1 which compares the use of zinc phenyl phosphinate with a control resin containing no nucleating agent.

Table 1-A compares the use of the art known sodium phenyl phosphinate with a control resin containing no nucleating agent.

Comparing Tables 1 and 1-A, it is seen that while both zinc phenyl phosphinate and sodium phenyl phosphinate increase tensile strength, reduce mold shrinkage, and decrease elongation, the use of zinc phenyl phosphinate does not substantially decrease the Izod impact strength of the resin over virgin resin as does the use of sodium phenyl phosphinate.

TABLE 1

| Control A 6 Runs | Zinc Phenyl Phosphinate (%) | Tensile Strength (psi) | Elongation (%) | Izod Impact Strength (ft-lb/in) | Mold Shrinkage (in/in) |
|---|---|---|---|---|---|
| No phosphinate present | 0 | 12200 | 50 | .9 | .016 |
| | 0 | 12500 | 50 | 1.1 | .017 |
| | 0 | 12300 | 54 | 1.0 | .017 |
| | 0 | 12200 | 60 | 1.0 | .017 |
| | 0 | 12100 | 63 | 1.0 | .017 |
| | 0 | 12000 | 70 | 1.1 | .018 |
| Average | | 12200 | 58 | 1.0 | .017 |
| Example 1 | | | | | |
| 8 Runs Phosphinate present | 0.1 | 13100 | 35 | .8 | .010 |
| | 0.1 | 13400 | 40 | .9 | .011 |
| | 0.1 | 13500 | 33 | .9 | .010 |
| | 0.1 | 13600 | 29 | .8 | .010 |
| | 0.1* | 13300 | 37 | .8 | .011 |
| | 0.1** | 13400 | 38 | .9 | .011 |
| | 0.1*** | 13700 | 28 | .7 | .009 |
| | 0.1*** | 13100 | 25 | .9 | .009 |
| Average | | 13450 | 32 | .8 | .010 |

*resin contains 0.3% N-stearyl erucamide (Lubricant for mold release)
**resin contains 0.3% stearyl alcohol (Lubricant for mold release)
***resin contains 0.15% stearyl alcohol, 0.15% N-stearyl erucamide and the resin particles were coated with a mixture of 0.9% aluminumdistearate and 0.02% ethylene bis-stearamide,to give them improved handling and feeding characteristicsin the molding machine. This changesthe pellet to pellet frictional behavior.

TABLE 1-A

| Control B 6 Runs | Sodium Phenyl Phosphinate % | Tensile Strength (psi) | Elongation (%) | Izod Impact Strength (ft-lb/in) | Mold Shrinkage (in/in) |
|---|---|---|---|---|---|
| No phosphinate present | 0 | 12100 | 90 | .9 | .017 |
| | 0 | 11800 | 38 | 1.1 | .015 |
| | 0 | 12400 | 58 | .9 | .017 |
| | 0 | 12200 | 61 | .9 | .017 |
| | 0 | 12000 | 56 | 1.1 | .017 |
| | 0 | 12000 | 100 | 1.0 | .018 |
| Average | | 12100 | 67 | 1.0 | .017 |
| Example 1 7 Runs Sodium phenyl phosphinate present | .1 | 15100 | 19 | .5 | .008 |
| | .1 | 14600 | 10 | .5 | .007 |
| | .1* | 14350 | 12 | .6 | .007 |
| | .1 | 14000 | 5 | .5 | .009 |
| | .1* | 13800 | 14 | .5 | .008 |
| | .1* | 14300 | 28 | .6 | .009 |
| | .1** | 14700 | 14 | .5 | .009 |

TABLE 1-A-continued

| Control B 6 Runs | Sodium Phenyl Phosphinate % | Tensile Strength (psi) | Elongation (%) | Izod Impact Strength (ft-lb/in) | Mold Shrinkage (in/in) |
|---|---|---|---|---|---|
| Average | | 14400 | 15 | .5 | .008 |

*resin also compounded to contain 0.15% stearyl alcohol, 0.15% N-stearyl erucamide and 0.09% aluminum distearate
**resin also compounded to contain 0.15% stearyl alcohol, 0.15% N-stearyl erucamide and then the pellets obtained were coated with 0.09% aluminum stearate and 0.02% ethylene bis-stearamide.

EXAMPLE 2

Table 2 records the effect of varying amounts of zinc phenyl phosphinate present in nylon 6,6 polyamides, prepared as described further above.

TABLE 2
PROPERTIES OF NYLON 66 NUCLEATED WITH ZINC PHENYL PHOSPHINATE OVER A RANGE OF CONCENTRATIONS
Dry as Molded

| Example 2 Run | Zinc Phenyl Phosphinate (%) | Tensile Strength (psi) | Elongation (%) | Izod Impact Strength (ft-lb/in) | Mold Shrinkage (in/in) |
|---|---|---|---|---|---|
| Comparison | 0 | 12,200 | 60 | 1.0 | .017 |
| 2-A | .001 | 12,400 | 53 | 1.0 | .017 |
| 2-B | .01 | 13,300 | 29 | .9 | .012 |
| 2-C | .1 | 13,600 | 29 | .8 | .010 |

EXAMPLE 3

Various polyamide resins were blended with zinc phenyl phosphinate as described further above. Table 3 records the polyamides employed, the amount of phosphinate present and the properties of the blends.

TABLE 3
PROPERTIES OF NYLONS NUCLEATED WITH .1% ZINC PHENYL PHOSPHINATE
Dry as Molded

| Resin Composition | Zinc Phenyl Phosphinate (%) | Tensile Strength (psi) | Elongation (%) | Izod Impact Strength (ft-lb/in) | Mold Shrinkage (in/in) |
|---|---|---|---|---|---|
| Nylon 66/6 copolymer | 0 | 12,200 | 79 | 1.1 | .017 |
| Nylon 66/6 copolymer | .1 | 12,900 | 63 | 1.0 | .011 |
| Nylon 612 | 0 | 9,200 | 138 | 1.0 | .018 |
| Nylon 612 | .1 | 9,900 | 73 | .9 | .012 |
| Nylon 66 | 0 | 12,300 | 54 | 1.0 | .017 |
| Nylon 66 | .1 | 13,500 | 33 | .9 | .010 |

EXAMPLE 4

In this Example, a nylon 66/phosphonate concentrate containing 1% phosphonate was prepared by mixing and extruding through a twin screw extruder. The 1% concentrate was then mixed with additional nylon 6,6 to obtain the concentrations shown in Table 4 and the mixture extruded as before. Table 4 describes blends of varying amounts of phosphonate and the properties of each blend.

TABLE 4

| Run | Zinc Phenyl Phosphonate (%) | Dry as Molded | | Izod Impact (ft. lb./in) | Mold Shrinkage (in/in) |
| --- | --- | --- | --- | --- | --- |
| | | Tensile Strength (psi) | Elongation(%) | | |
| Comparison | 0 | 12,300 | 62 | 1.1 | .018 |
| 1 | .1 | 13,500 | 36 | .8 | .010 |
| 2 | .05 | 13,400 | 35 | .8 | .011 |
| 3 | .15 | 13,500 | 34 | .8 | .010 |

The embodiments of the invention in which an exclusive property or privilege is claimed are as follows:

1. A polyamide resin consisting essentially of a blend of (a) a condensation polyamide resin made by the condensation of linear diamines represented by the formula $H_2N-(CH_2)_x-NH_2$, where x is an integer from 6 to 12, with linear dicarboxylic acids represented by the formula $HO_2C-(CH_2)_y-CO_2H$, where y is an integer between 1 and 8, and (b) zinc phenyl phosphinate or zinc phenyl phosphonate or a mixture of the two present in an amount sufficient to accelerate crystallization from a melt of the blend over a melt of the polyamide resin alone.

2. The resin of claim 1 wherein the polyamide is predominately polyhexamethylene adipamide.

3. The resin of claim 1 or 2 wherein the phosphinate or phosphonate or mixture of the two is present in an amount of between about 0.01 and about 1.0 weight percent based on weight of polyamide.

4. The resin of claim 1 or 2 in the form of pellets wherein the phosphinate or phosphonate or mixture of the two is melt-blended in the granules.

5. The resin of claim 1 or 2 in the form of pellets wherein the phosphinate or phosphonate or mixture of the two is coated on the pellets.

* * * * *